US012540015B2

(12) United States Patent
Desilva et al.

(10) Patent No.: US 12,540,015 B2
(45) Date of Patent: Feb. 3, 2026

(54) LIQUID PRODUCT DISPENSER WITH TAMPER RESISTANT OVERCAP

(71) Applicant: Machan Investments LLC, Gardena, CA (US)

(72) Inventors: Ash Asela Desilva, Long Beach, CA (US); Anuradha Andy De Silva, Ranchos Palos Verdes, CA (US); Shehan James, Los Angeles, CA (US); Dinesh Weerasekera, Fullerton, CA (US)

(73) Assignee: Hotel Emporium Inc., Gardena, CA (US)

(*) Notice: Subject to any disclaimer, the term of this patent is extended or adjusted under 35 U.S.C. 154(b) by 162 days.

(21) Appl. No.: 18/464,740

(22) Filed: Sep. 11, 2023

(65) Prior Publication Data

US 2025/0083876 A1 Mar. 13, 2025

(51) Int. Cl.
*B65D 50/00* (2006.01)
*B05B 11/10* (2023.01)

(52) U.S. Cl.
CPC .......... *B65D 50/00* (2013.01); *B05B 11/1001* (2023.01)

(58) Field of Classification Search
CPC ...... B65D 50/00; B65D 83/22; B65D 83/226; B05B 11/1001
USPC .................................................... 222/153.09
See application file for complete search history.

(56) References Cited

U.S. PATENT DOCUMENTS

| | | | | |
|---|---|---|---|---|
| 4,615,476 | A | 10/1986 | Hobbs et al. | |
| 6,041,974 | A | 3/2000 | Poltras et al. | |
| 6,370,992 | B1 * | 4/2002 | Shih-Kuei | B25G 1/06 81/177.9 |
| 8,690,023 | B2 * | 4/2014 | Santoni | B05B 11/1077 222/321.9 |
| 9,155,428 | B2 * | 10/2015 | Haworth | A47K 5/12 |
| 10,342,391 | B2 | 7/2019 | Beckerman | |
| 11,022,168 | B1 | 6/2021 | Brenner | |
| 2011/0259920 | A1 | 10/2011 | Rennie et al. | |
| 2022/0007897 | A1 | 1/2022 | Lugano | |
| 2022/0033141 | A1 | 2/2022 | Brenner | |
| 2022/0167802 | A1 * | 6/2022 | Bing | A47K 5/1205 |

* cited by examiner

*Primary Examiner* — David P Angwin
(74) *Attorney, Agent, or Firm* — Eric Karich; Karich & Associates

(57) ABSTRACT

A tamper resistant dispensing system has a liquid product dispenser having a container body adapted to contain the liquid. The container body has an externally threaded neck that extends to an opening, and a dispenser cap that includes an actuator, an internally threaded closure, and a stem. The internally threaded closure threadedly mounts upon the externally threaded neck such that the stem extends into the container body. A tamper resistant overcap has an annular body adapted to be positioned around the internally threaded closure of the dispenser cap. The annular body has a height and a width that are great enough to substantially cover the internally threaded closure, a pair of access holes are on opposite sides of the annular body.

10 Claims, 3 Drawing Sheets

LIQUID PRODUCT DISPENSER WITH TAMPER RESISTANT OVERCAP

BACKGROUND OF THE INVENTION

Field of the Invention

This invention relates generally to tamper resistant devices, and more particularly to a tamper resistant overcap for preventing tampering with a liquid product dispenser.

Description of Related Art

Haworth, U.S. Pat. No. 9,155,428, teaches a dispensing device for dispensing liquid product (e.g., soap, shampoo). The device includes a flange assembly with a top surface and a removable section with a plurality of attachment tabs, a stationary section with a plurality of receiving slots and a plurality of pump apertures that hold and secure the dispensing bottles. There is also a mountable lock to lock the dispensing bottles in place and a bottom support surface for supporting the dispensing bottles.

Poitras, U.S. Pat. No. 6,041,974, teaches a support apparatus for a liquid product dispenser. The apparatus includes a housing for mounting the dispenser on a surface. The housing defines a guide, and a support surface for receiving the flange to removably support the container; a latch; and a retainer shaped and arranged for reciprocating movement on the guide between open and closed positions and in a first direction relative to the housing and for reciprocating movement in a second direction different than the first direction and between the closed position and a latched position. The retainer, in its open position, allows removal of the container from the housing, in its closed position, prevents removal, and, in its latched position, is prevented from movement in the first direction by the latch.

Brenner, U.S. 20220033141, teaches a retaining system for mounting a liquid product dispenser on a wall. The system includes a cover, and a support mount configured to cooperate with the cover to securely retain a first portion of a fluid container. The support mount includes a securing assembly having a suction cup that is configured to removably secure the fluid container retaining system to a surface of a structure. A stand is configured to secure to a second portion of the fluid container.

Rossi, U.S. 20220007897, teaches a dispensing unit that includes a wall-mountable support device and a dispenser. The support device has a mounting body having a foot from which an engagement projection protrudes, a covering body having a gripping portion with a collar engageable with the dispenser, and security means suitable for forming a snap-engagement between the covering body and the mounting body. The engagement projection has a predefined configuration for univocally coupling with a bottom of a bottle of the dispenser.

SUMMARY OF THE INVENTION

The present invention teaches certain benefits in construction and use which give rise to the objectives described below.

The present invention provides a tamper resistant dispensing system for dispensing a liquid. The tamper resistant dispensing system comprises a liquid product dispenser having a container body adapted to contain the liquid. The container body has an externally threaded neck that extends to an opening, and a dispenser cap that includes an actuator, an internally threaded closure, and a stem. The internally threaded closure threadedly mounts upon the externally threaded neck such that the stem extends into the container body. A tamper resistant overcap comprises an annular body adapted to be positioned around the internally threaded closure of the dispenser cap. The annular body has a height and a width that are great enough to substantially cover the internally threaded closure, a pair of access holes are on opposite sides of the annular body.

A primary objective of the present invention is to provide a tamper resistant dispensing system having advantages not taught by the prior art.

Another objective is to provide a tamper resistant dispensing system that includes a container that includes an overcap that prevents the closure of the container from being opened without the use of an unlocking tool.

Another objective is to provide a tamper resistant dispensing system having an unlocking tool the easily enables removal of a dispenser cap of a liquid product dispenser.

A further objective is to provide a tamper resistant dispensing system having a tamper resistant overcap that cannot be separated without breaking the overcap or using a separating tool.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a tamper resistant dispensing system for dispensing a liquid, in this embodiment in the form of a personal care product (e.g., soap, lotion, shampoo, etc.). The tamper resistant dispensing system includes a tamper resistant overcap that prevents users (e.g., hotel guests) from opening a liquid product dispenser of the system. An authorized person (e.g., an employee of the hotel) can use an unlocking tool to open the liquid product dispenser through the tamper resistant overcap, for refilling and cleaning the liquid product dispenser.

Figure 1:
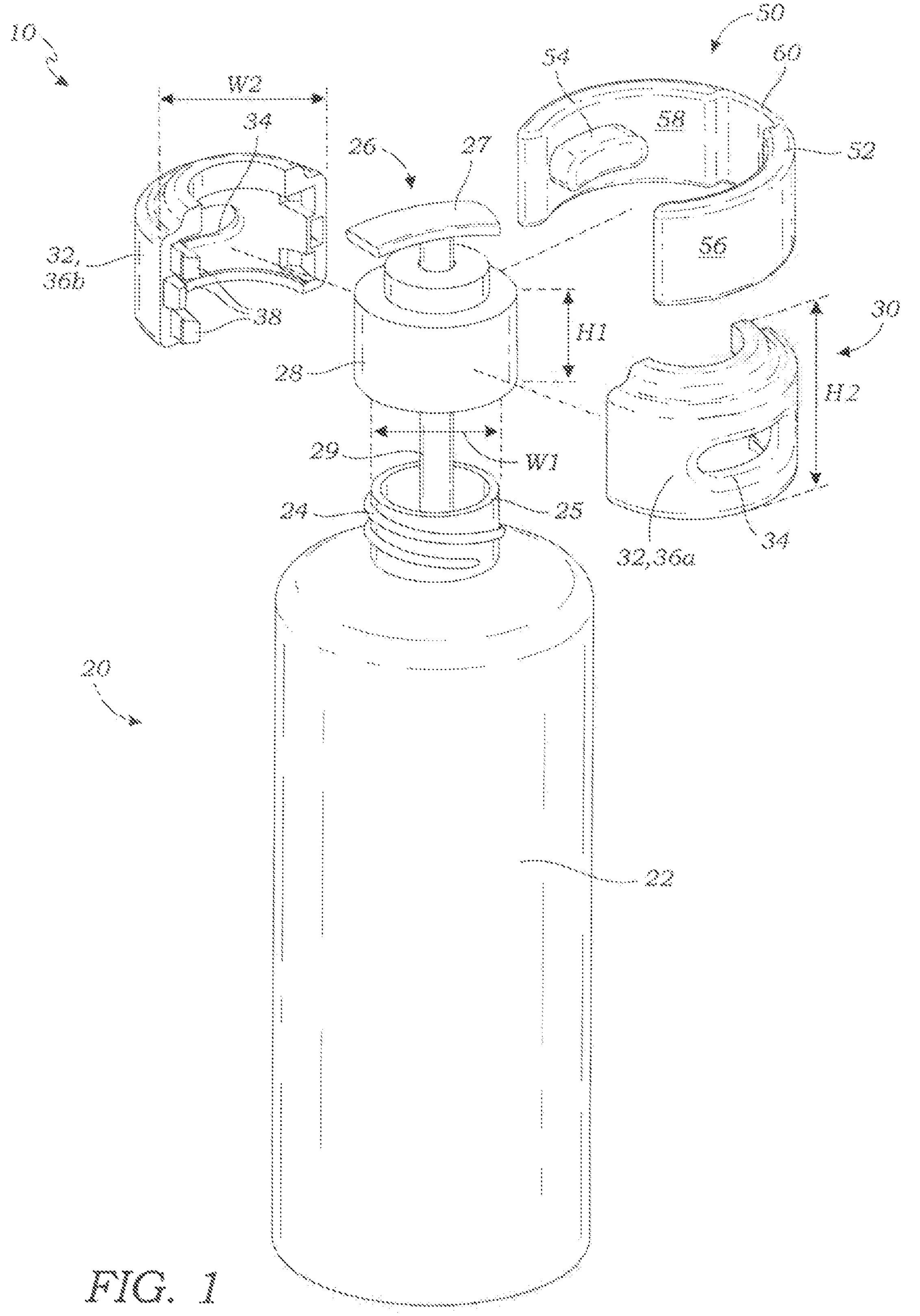
FIG. 1 is an exploded perspective view of a tamper resistant dispensing system that includes a liquid product dispenser, a tamper resistant overcap, and an unlocking tool, according to one embodiment of the present invention.
Figure 2:
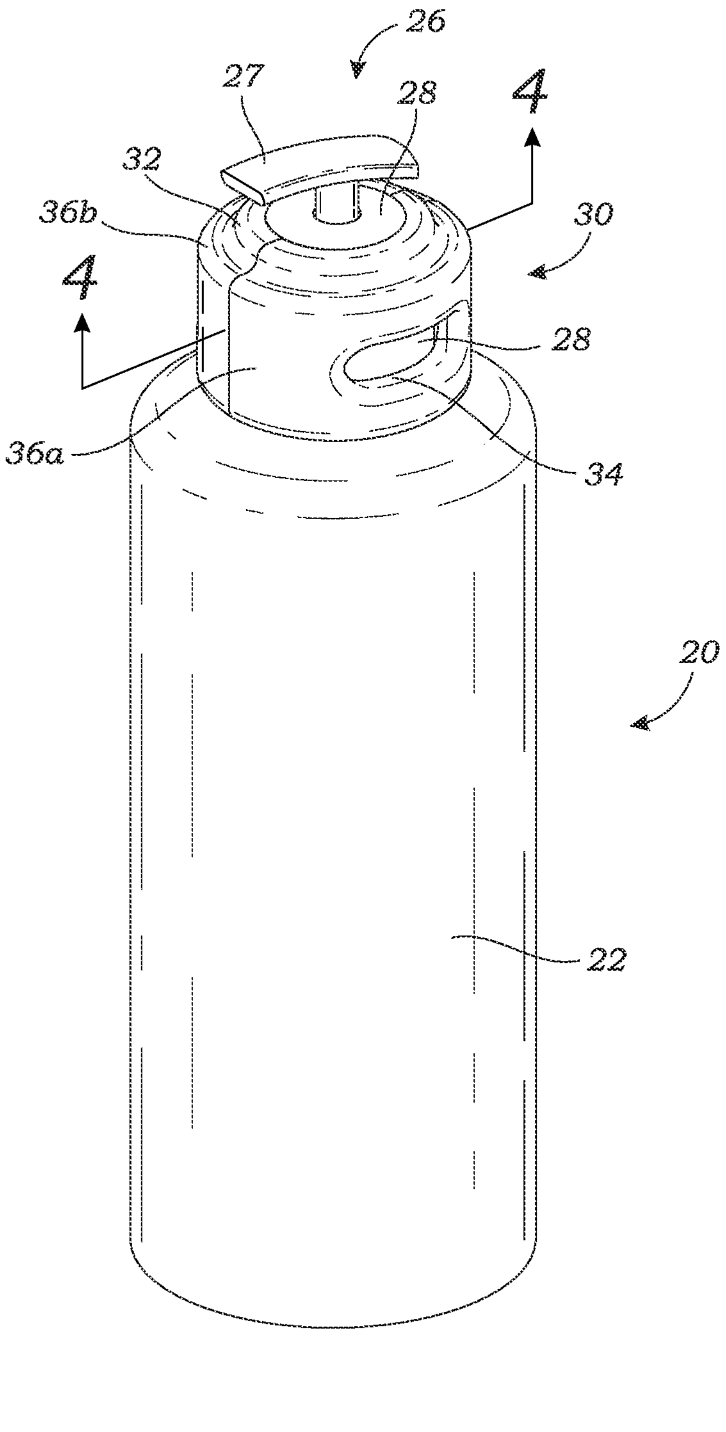
FIG. 2 is a perspective view of the tamper resistant dispensing system once assembled and with the tamper resistant overcap installed upon the liquid product dispenser.

FIG. 1 is an exploded perspective view of a tamper resistant dispensing system 10 that includes a liquid product dispenser 20, a tamper resistant overcap 30, and an unlocking tool 50, according to one embodiment of the present invention. FIG. 2 is a perspective view of the tamper resistant dispensing system 10 once assembled and with the tamper resistant overcap 30 installed upon the liquid product dispenser 20.

As shown in FIGS. 1-2, the liquid product dispenser 20 includes a container body 22 adapted to contain the liquid. The container body 22 may be of generally common construction, having an externally threaded neck 24 that extends to an opening 25. In this embodiment, the container body 22 is a generally cylindrical container, but in other embodiments, the container body 22 may have any other shape, such as a container with a generally rectangular cross-section, or any other suitable shape for containing the liquid.

The container body 22 further has a dispenser cap 26 that includes an actuator 27, an internally threaded closure 28, and a stem 29, wherein the internally threaded closure 28 threadedly mounts upon the externally threaded neck 24 such that the stem 29 extends into the container body 22. The internally threaded closure 28 has a width W1 and a height H1. While one example of the dispenser cap 26 is illustrated, other shapes and forms of dispenser caps may be implemented. The container body 22 may be of any standard construction known in the art adapted to contain soap, lotion, shampoo, etc., although any desired liquids may be dispensed, so the examples listed herein should not be considered limiting.

Figure 3:
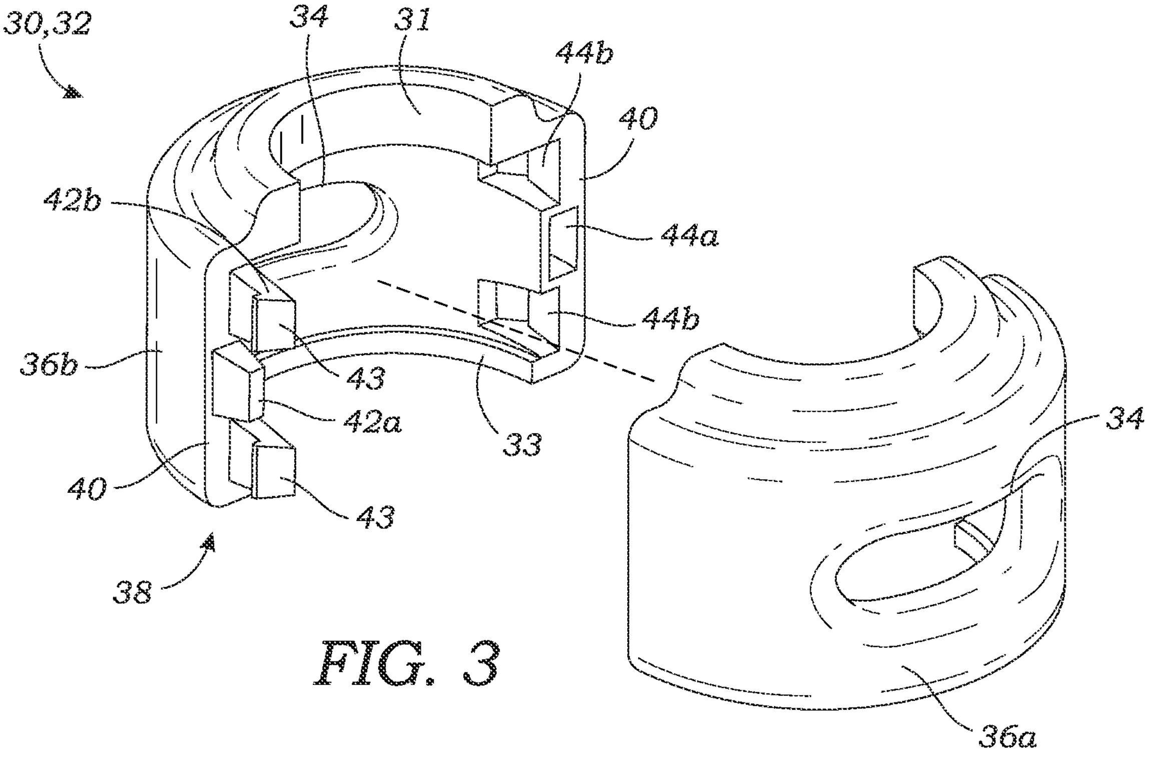
FIG. 3 is a perspective view of first and second halves of the tamper resistant overcap.

FIG. 3 is a perspective view of the tamper resistant overcap 30, in this embodiment having first and second halves 36*a* and 36*b*, although halves in this case is defined to include any fraction thereof, and need not be equal. As shown in FIGS. 1-3, the tamper resistant overcap 30 of this embodiment comprises, when assembled, an annular body 32 adapted to be positioned around the internally threaded closure 28 of the dispenser cap 26. The annular body 32 includes a top annular flange 31 and a bottom annular flange 33 which fit around the internally threaded closure 28 so that the overcap 30 cannot be removed once the two halves 36*a* and 36*b* are locked together.

The annular body 32 has a height H2 and a width W2 that are great enough to substantially cover the internally threaded closure 28. In other words, H2 is greater than H1, and W2 is greater than W1. The annular body 32 further includes a pair of access holes 34, the holes being formed on opposite sides of the annular body 32. The pair of access holes 34 are adapted to receive a pair of posts 54 of the unlocking tool 50 (shown in FIG. 1), as discussed in more detail below.

In this embodiment, the annular body 32 of the overcap 30 is formed as the first and second interlocking halves 36*a* and 36*b* each having fasteners 38 which lock the first and second halves 36 together. In various embodiments, the fasteners 38 may be in the form of locking fasteners that lockingly engage one another so that they cannot be separated. For the purposes of this application, "cannot be separated" is defined to mean that the fasteners 38 cannot be separated without breaking the tamper resistant overcap 30 or using a separating tool (not shown), such that the general public is not able to separate the halves 36*a* and 36*b*.

In some embodiments, each half 36*a* or 36*b* of the overcap 30 has a pair of interlocking surfaces 40 that contact the interlocking surfaces 40 of the other half 36*a* or 36*b* when the overcap 30 is mounted on the internally threaded closure 28 of the dispenser cap 26. In this embodiment, the fasteners 38 are in the form of a plurality of projections 42 on one of the pair of interlocking surfaces 40, and a plurality of receiving cavities 44 on the other of the pair of interlocking surfaces 40, such that when the first and second halves 36 of the overcap 30 are interlocked, the plurality of projections 42 of each half 36 extends into the plurality of receiving cavities 44 of the other half 36. As illustrated, in this embodiment, the plurality of projections 42 is in the form of a center projection 42*a* positioned between two longer projections 42*b* having terminal hooks 43. In construction, the center projection 42*a* is received by a center receiving cavity 44*a* so that the center projection 42*a* is fully enclosed. The two longer projections 42*b* are received by top and bottom receiving cavities 44*b* that are shaped to frictionally engage the terminal hooks 43 so that the overcap 30 cannot be easily pulled apart, as discussed above.

Alternative embodiments may include a different number of projections and receiving cavities, in different configurations, i.e., without the terminal hooks 43, or with all projections including the terminal hooks, or similar structures. Furthermore, other fasteners may be implemented, e.g., other mechanical fasteners, or non-mechanical fasteners such as an adhesive, or any other suitable means devisable by one skilled in the art. In some embodiments, the overcap 30 may not be separable into the two halves 36, and instead is mounted on the dispenser cap 26 as a single unit, wherein it may be tightened to secure it to the dispenser cap 26. As illustrated, the unlocking tool 50 is adapted to interlock with the tamper resistant overcap 30 to remove the dispenser cap 26. The unlocking tool 50 is best shown in FIG. 3 and is discussed in greater detail below.

Figure 4:
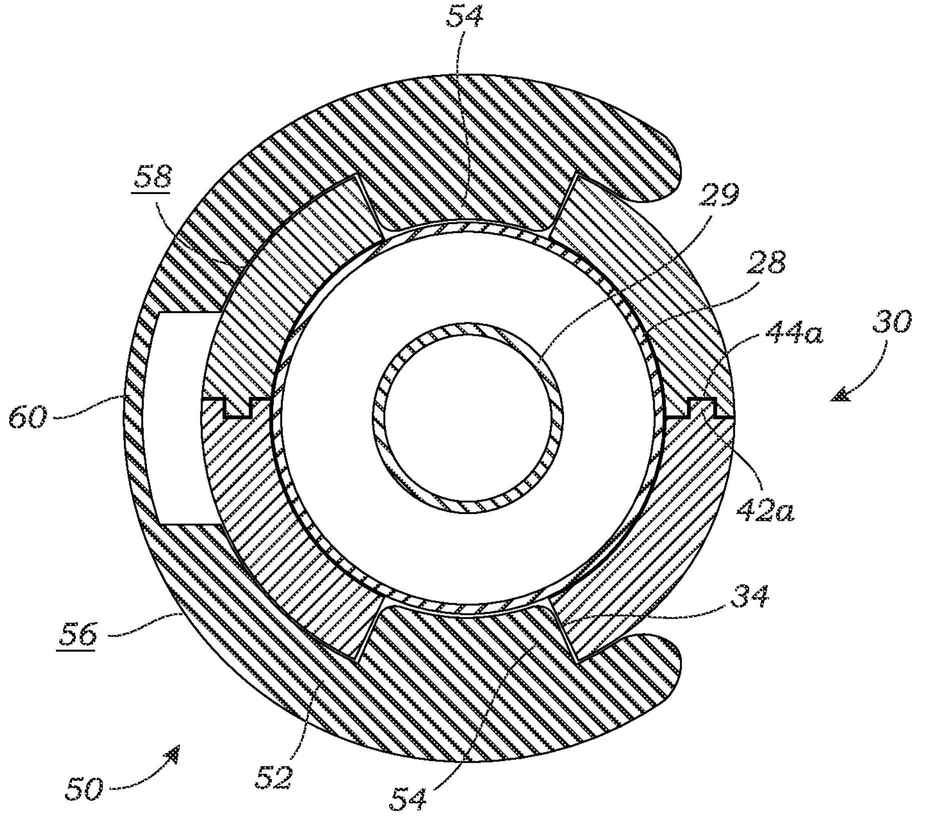
FIG. 4 is a sectional view of the tamper resistant system taken along line 4-4 in FIG. 2, illustrating the unlocking tool being used to open the liquid product dispenser through the tamper resistant overcap.

FIG. 4 is a sectional view of the tamper resistant system 10 taken along line 4-4 in FIG. 2, illustrating the unlocking tool 50 being used to open the liquid product dispenser 20 through the tamper resistant overcap 30. As shown in FIG. 4, the unlocking tool 50 includes a tool body 52 having the pair of posts 54 that are sized and shaped to fit through the pair of access holes 34 of the tamper resistant overcap 30 and contact the internally threaded closure 28 of the liquid product dispenser 20, for enabling the unlocking tool 50 to grip the dispenser cap 26 for unscrewing the dispenser cap 26 and opening the liquid product dispenser 20. As illustrated, the tool body 52 may have a semi-circular cross-section having an outer surface 56, and an inner surface 58 with the pair of posts 54 disposed thereupon. The pair of posts 54 may be disposed on opposite sides adjacent the opening of the semi-circle, wherein a resilient portion 60 is located opposite the opening, between the pair of posts 54.

In use, the unlocking tool 50 is positioned around the tamper resistant overcap 30 mounted on the dispenser cap 26 to remove the dispenser cap 26. The resilient portion 60 may enable the opening of the tool body 52 to increase for fitting around the overcap 30, wherein the pair of posts 54 pass through the pair of access holes 34 to contact the internally threaded closure 28 of the dispenser cap 26. The outer surface 56 of the tool body 52 may then be squeezed to push the pair of posts 54 inwardly against the internally threaded closure 28 of the dispenser cap 26, which may also be aided by the resilient portion 60. In some embodiments, the outer surface 56 may be gripped by a human hand during use, or it may include some form of handle (not shown) for gripping during use. For example, in alternative embodiments, the tool body 52 may be formed similar to pliers/tongs/etc., with a pair of handles. The user may use the unlocking tool 50 to twist the internally threaded closure 28 to remove the dispenser cap 26 from the container body 22, for refilling, cleaning, etc., wherein the unlocking tool 50 may be similarly used to re-secure the dispenser cap 26.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean +/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A tamper resistant dispensing system for dispensing a liquid, the tamper resistant dispensing system comprising:
- a liquid product dispenser comprising:
  - a container body adapted to contain the liquid, the container body having an externally threaded neck that extends to an opening; and
  - a dispenser cap that includes an actuator, an internally threaded closure, and a stem, wherein the internally threaded closure threadedly mounts upon the externally threaded neck such that the stem extends into the container body; and
- a tamper resistant overcap comprising:
  - an annular body be positioned radially around an axis of the internally threaded closure, so that the annular body can freely rotate around the axis of the internally threaded closure and thereby prevent unscrewing of the dispenser cap from the container body, the annular body having a height and a width that are great enough to cover the internally threaded closure; and
  - a pair of access holes on opposite sides of the annular body.

2. The tamper resistant dispensing system of claim 1, further comprising an unlocking tool that includes a tool body having a pair of posts that are sized and shaped to fit through the pair of access holes of the tamper resistant overcap and contact the internally threaded closure of the liquid product dispenser, for enabling the unlocking tool to grip the dispenser cap for unscrewing the dispenser cap and opening the liquid product dispenser.

3. The tamper resistant dispensing system of claim 1, wherein the tamper resistant overcap includes a first half and a second half which each include fasteners which lock the first and second halves together.

4. The tamper resistant dispensing system of claim 3, wherein the fasteners of the tamper resistant overcap are locking fasteners that lockingly engage one another so that they cannot be separated.

5. The tamper resistant dispensing system of claim 3, wherein the first half and the second half each have a pair of interlocking surfaces that contact the interlocking surfaces of the other half when the overcap is mounted on the internally threaded closure of the dispenser cap.

6. The tamper resistant dispensing system of claim 5, wherein the locking fasteners are in the form of a plurality of projections on one of the pair of interlocking surfaces, and a plurality of receiving cavities on the other of the pair of interlocking surfaces, such that when the first and second halves of the overcap are interlocked, the plurality of projections of each half extends into the plurality of receiving cavities of the other half.

7. The tamper resistant dispensing system of claim 6, wherein the plurality of projections is in the form of a center projection positioned between two longer projections having terminal hooks; and wherein the center projection is received by a center receiving cavity so that the center projection is fully enclosed, and the two longer projections are received by top and bottom receiving cavities that are shaped to frictionally engage the terminal hooks so that the first and second halves of the overcap cannot be separated.

8. The tamper resistant dispensing system of claim 2, wherein the tool body further includes a semi-circular cross-section having an outer surface, and an inner surface with the pair of posts disposed thereupon; and wherein the pair of posts are disposed on opposite sides adjacent the opening of the semi-circle, wherein a resilient portion is located opposite the opening between the pair of posts.

9. A tamper resistant dispensing system for dispensing a liquid, the tamper resistant dispensing system comprising:
- a liquid product dispenser comprising:
  - a container body adapted to contain the liquid, the container body having an externally threaded neck that extends to an opening; and
  - a dispenser cap that includes an actuator, an internally threaded closure, and a stem, wherein the internally threaded closure threadedly mounts upon the externally threaded neck such that the stem extends into the container body; and
- a tamper resistant overcap comprising:
  - an annular body adapted to be positioned around the internally threaded closure of the dispenser cap, the annular body having a height and a width that are great enough to cover the internally threaded closure; and
  - a pair of access holes on opposite sides of the annular body;
- wherein the tamper resistant overcap includes a first half and a second half which each include fasteners which lock the first and second halves together;
- wherein the first half and the second half each have a pair of interlocking surfaces that contact the interlocking surfaces of the other half when the overcap is mounted on the internally threaded closure of the dispenser cap;
- wherein the locking fasteners are in the form of a plurality of projections on one of the pair of interlocking surfaces, and a plurality of receiving cavities on the other of the pair of interlocking surfaces, such that when the first and second halves of the overcap are interlocked, the plurality of projections on the one pair of interlocking surfaces extends into the plurality of receiving cavities of the other half, and
- wherein the plurality of projections is in the form of a center projection positioned between two longer projections having terminal hooks; and wherein the center projection is received by a center receiving cavity so that the center projection is fully enclosed, and the two longer projections are received by top and bottom receiving cavities that are shaped to frictionally engage the terminal hooks so that the first and second halves of the overcap cannot be separated.

10. A tamper resistant dispensing system for dispensing a liquid, the tamper resistant dispensing system comprising:
- a liquid product dispenser comprising:

a container body adapted to contain the liquid, the container body having an externally threaded neck that extends to an opening; and a dispenser cap that includes an actuator, an internally threaded closure, and a stem, wherein the internally threaded closure threadedly mounts upon the externally threaded neck such that the stem extends into the container body; and a tamper resistant overcap comprising:

an annular body adapted to be positioned around the internally threaded closure of the dispenser cap, the annular body having a height and a width that are great enough to cover the internally threaded closure; and a pair of access holes on opposite sides of the annular body;

further comprising an unlocking tool that includes a tool body having a pair of posts that are sized and shaped to fit through the pair of access holes of the tamper resistant overcap and contact the internally threaded closure of the liquid product dispenser, for enabling the unlocking tool to grip the dispenser cap for unscrewing the dispenser cap and opening the liquid product dispenser; and wherein the tool body further includes a semi-circular cross-section having an outer surface, and an inner surface with the pair of posts disposed thereupon; and wherein the pair of posts are disposed on opposite sides adjacent the opening of the semi-circle, wherein a resilient portion is located opposite the opening between the pair of posts.

* * * * *